United States Patent
Wiesner et al.

(10) Patent No.: US 9,527,041 B2
(45) Date of Patent: Dec. 27, 2016

(54) MULTIBLOCK COPOLYMER FILMS, METHODS OF MAKING SAME, AND USES THEREOF

(75) Inventors: Ulrich B. Wiesner, Ithaca, NY (US); Rachel M. Dorin, Ithaca, NY (US); Joerg Werner, Ithaca, NY (US); William A. Phillip, New Haven, CT (US)

(73) Assignees: Cornell University, Ithaca, NY (US); Yale University, New Haven, CT (US)

( * ) Notice: Subject to any disclaimer, the term of this patent is extended or adjusted under 35 U.S.C. 154(b) by 427 days.

(21) Appl. No.: 14/115,218

(22) PCT Filed: May 4, 2012

(86) PCT No.: PCT/US2012/036514
§ 371 (c)(1),
(2), (4) Date: Mar. 26, 2014

(87) PCT Pub. No.: WO2012/151482
PCT Pub. Date: Nov. 8, 2012

(65) Prior Publication Data
US 2014/0217012 A1    Aug. 7, 2014

Related U.S. Application Data

(60) Provisional application No. 61/482,354, filed on May 4, 2011.

(51) Int. Cl.
*B01D 67/00* (2006.01)
*B01D 71/26* (2006.01)
(Continued)

(52) U.S. Cl.
CPC .......... *B01D 67/0009* (2013.01); *B01D 69/12* (2013.01); *B01D 71/26* (2013.01); *B01D 71/28* (2013.01);
(Continued)

(58) Field of Classification Search
None
See application file for complete search history.

(56) References Cited

U.S. PATENT DOCUMENTS 4,399,035 A * 8/1983 Nohmi .................. B01D 61/145
210/500.23
5,158,721 A   10/1992 Allegrezza, Jr. et al.
(Continued)

FOREIGN PATENT DOCUMENTS

CN   101460203   6/2009
EP   2160946     3/2010
(Continued)

OTHER PUBLICATIONS

Peinemann, et al, "Asymmetric superstructure formed in a block copolymer vis phase separation", Nature, 2009.*
(Continued)

*Primary Examiner* — Krishnan S Menon
(74) *Attorney, Agent, or Firm* — Blank Rome LLP

(57) ABSTRACT

A method for forming an isoporous graded film comprising multiblock copolymers and isoporous graded films. The films have a surface layer and a bulk layer. The surface layer can have at least $1\times10^{14}$ pores/m$^2$ and a pore size distribution ($d_{max}/d_{min}$) of less than 3. The bulk layer has an asymmetric structure. The films can be used in filtration applications.

10 Claims, 10 Drawing Sheets

(51) Int. Cl.
*B01D 71/44* (2006.01)
*B01D 71/80* (2006.01)
*B01D 69/12* (2006.01)
*B01D 71/28* (2006.01)
*C08J 5/18* (2006.01)
*C08F 297/04* (2006.01)
*C08L 53/00* (2006.01)
*B01D 69/02* (2006.01)

(52) U.S. Cl.
CPC ............... *B01D 71/44* (2013.01); *B01D 71/80* (2013.01); *C08F 297/04* (2013.01); *C08J 5/18* (2013.01); *C08L 53/00* (2013.01); *B01D 69/02* (2013.01); *B01D 2325/021* (2013.01); *B01D 2325/023* (2013.01); *B01D 2325/04* (2013.01); *B01D 2325/48* (2013.01); *C08J 2353/00* (2013.01)

(56) References Cited

U.S. PATENT DOCUMENTS

| | | | |
|---|---|---|---|
| 6,592,991 B1 * | 7/2003 | Wiesner | B01D 71/00 427/221 |
| 2004/0138323 A1 | 7/2004 | Stenzel-Rosebaum et al. | |
| 2009/0173694 A1 * | 7/2009 | Peinemann | B01D 67/0011 210/650 |

FOREIGN PATENT DOCUMENTS

| | | |
|---|---|---|
| JP | 54145766 | 11/1979 |
| WO | 2008034487 | 3/2008 |
| WO | 2010/051150 A1 | 5/2010 |
| WO | 2011123033 | 10/2011 |

OTHER PUBLICATIONS

Phillip, W., et al., Tuning Structure and Properties of Graded Triblock Terpolymer-Based Mesoporous and Hybrid Films, Nano Letters, Jun. 7, 2011, Nov. 11, pp. 2892-2900.
Albert, J., et al., Self-assembly of block copolymer thin films, Materialstoday, Jun. 2010, vol. 13, No. 6, pp. 24-33.
Jung et al., Structure Formation of Integral Asymmetric Composite Membranes of Polystyrene-block-Poly(2-vinylpuridine) on a Nonwoven, Macromolecular Materials and Engineering, vol. 297, No. 8, pp. 790-798. Feb. 9, 2012.
Tiraferri et al., Binding Silver and Silica Nanoparticles to Polymeric Membrane Surfaces for Novel Anti-Biofouling Properties, ACS Division Proceedings, Division of Polymer Chemistry, Meeting 242, Aug. 28-Sep. 1, 2011, Denver, CO, USA. Sep. 1, 2011.
Hoek et al., Physical-chemical properties, separation performance, and fouling resistance of mixed-matrix ultrafiltration member, Desalination, Elsevier, vol. 283, pp. 89-99. May 4, 2011.
Hanselmann, Blockcopolymere, ROMPP Online, Version 3.37, Dokumentkennung RD-02-02007. Jul. 1, 2009.
Dai et al., Fabrication of 2D ordered structure of self-assembled block copolymers containing gold nanoparticles, Journal of Crystal Growth, vol. 288, No. 1, pp. 128-136. Feb. 2, 2006.

* cited by examiner

MULTIBLOCK COPOLYMER FILMS, METHODS OF MAKING SAME, AND USES THEREOF

CROSS-REFERENCE TO RELATED APPLICATIONS

This application claims priority to U.S. provisional patent application No. 61/482,354, filed May 4, 2011 the disclosure of which is incorporated herein by reference.

STATEMENT REGARDING FEDERALLY SPONSORED RESEARCH

This invention was made with government support under National Science Foundation Graduate Research Fellowship Grant No. DGE-0707428 awarded by the National Science Foundation. The Government has certain rights in the invention.

FIELD OF THE INVENTION

The field of the invention generally relates to methods of making multiblock copolymer films and uses of such films. More particularly, the invention relates to methods for making isoporous graded films of multiblock copolymers and uses of such films.

BACKGROUND OF THE INVENTION

Understanding and controlling the transport of chemical species at the nanoscale is important for the design of novel devices and systems capable of addressing several of the issues facing chemical separations, drug delivery, and molecular sensing. Many of these technologies will rely on a membrane or film with robust mechanical properties and well-controlled pore dimensions and chemistries. In order to advance the understanding and implementation of technologies that exploit transport phenomena at the nanoscale, it is essential to make significant progress towards the fabrication and characterization of next generation, high performance mesoporous materials.

Membranes based on diblock copolymer and triblock terpolymer self-assembly have been generated through bulk casting, but these materials suffer from low permeability due to relatively thick selective layers. Mesoporous films from diblock copolymers have been fabricated by spin coating onto solid substrates; however, this method requires long annealing times and the tedious transfer of a fragile film from the primary substrate to a secondary support membrane.

BRIEF SUMMARY OF THE INVENTION

In an aspect, the present invention provides methods for making an isoporous graded film of a multiblock copolymer. In an embodiment, the method comprises the steps of: forming a film comprising a multiblock copolymer having a hydrogen-bonding block (e.g., poly((4-vinyl)pyridine), poly ((2-vinyl) pyridine), poly(ethylene oxide), poly(methacrylate), poly(methyl methacrylate), poly(dimethylethyl amino ethyl methacrylate), poly(acrylic acid), and poly(hydroxystyrene)) that can self-assemble on a substrate using a deposition solution comprising the multiblock copolymer and a solvent system (e.g., 1,4-dioxane); removing at least a portion of the solvent system from the film; and contacting the film from step b) with a phase separation solvent system, such that the isoporous graded film is formed.

In an embodiment, the multiblock copolymer has a low $T_g$ block. For example, the low Tg block can be poly(isoprene), poly(butadiene), poly(butylene), or poly(isobutylene). In an embodiment, the deposition solution further comprises a homopolymer or a small molecule and the film further comprises the homopolymer or the small molecule.

In an aspect, the present invention provides an isoporous graded film. The film comprises a multiblock copolymer. The multiblock copolymer has a hydrogen-bonding block (e.g., poly((4-vinyl)pyridine), poly((2-vinyl) pyridine), poly (ethylene oxide), poly(methacrylate), poly(methyl methacrylate), poly(dimethylethyl amino ethyl methacrylate), poly(acrylic acid), and poly(hydroxystyrene)). In an embodiment, the multiblock copolymer has a low $T_g$ polymer block (e.g., poly(isoprene), poly(butadiene), poly(butylene), and poly(isobutylene)). The film can have a thickness of from 5 microns to 500 microns.

In an embodiment, the film is a hybrid film. The hybrid film comprises a multiblock copolymer and a homopolymer or small molecule. In an embodiment, the film has at least one inorganic material, and the inorganic material is disposed on at least a portion of the film. For example, the inorganic material is a metal (e.g., metal nanoparticles), metal oxide or a semiconductor.

In an aspect, the present invention provides a device with a film of the present invention. In an embodiment, the film is a filtration membrane in a device.

DETAILED DESCRIPTION OF THE INVENTION

Figure 1:
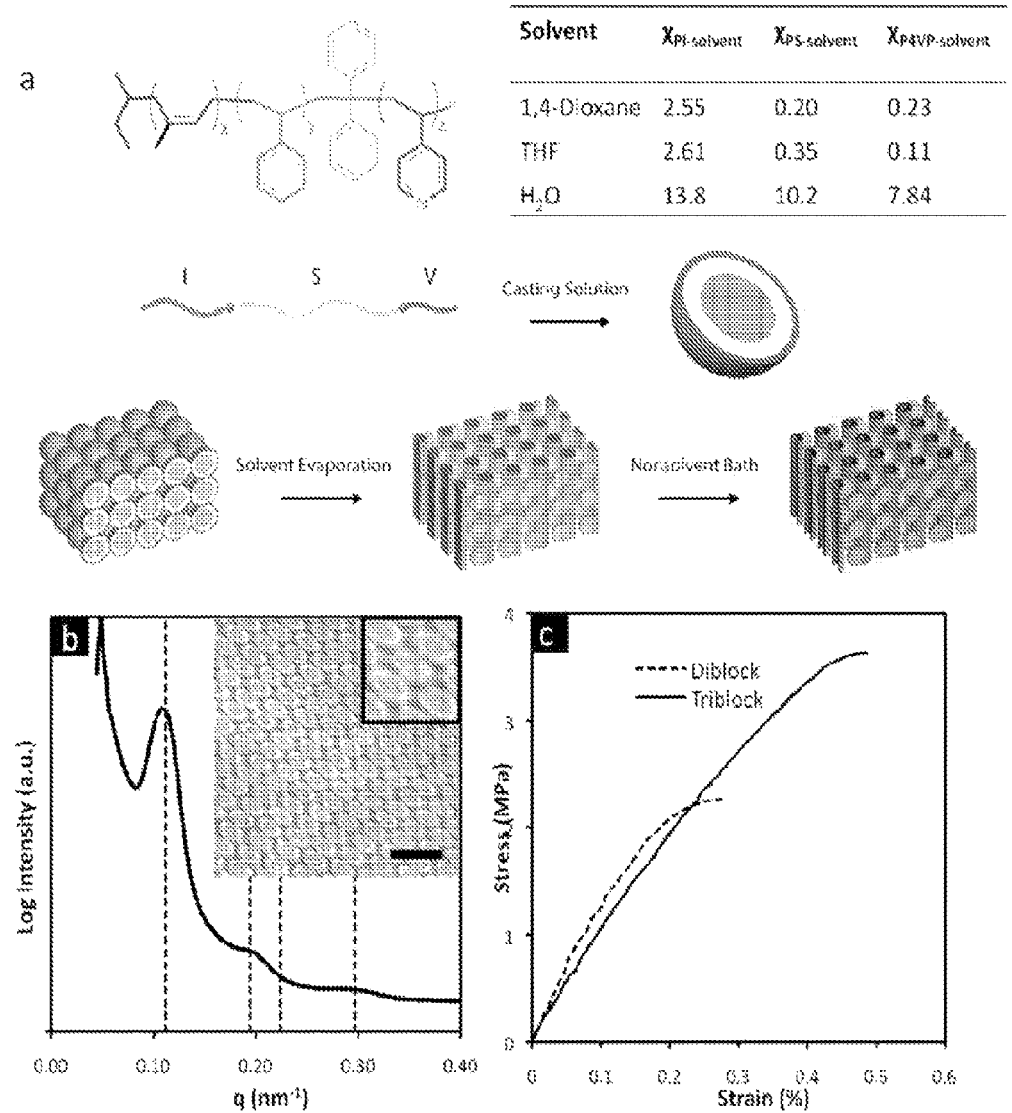
FIG. 1. Example of mesoporous films cast from a poly (isoprene-b-styrene-b-4-vinyl pyridine) (ISV) triblock terpolymer. a. The structure of a ISV terpolymer, table indicating the polymer-solvent interaction parameters as calculated from solubility parameters, and proposed formation mechanism of the separation layer b. Representative small-angle X-ray scattering (SAXS) trace of the bulk ISV material. Dashed lines correspond to peak positions $(q/q^*)^2=1$, 3, 4, and 7, expected for a hexagonal lattice. Inset: TEM image of the terpolymer film selectively stained with $OsO_4$. The higher magnification inset displays the interconnected white polystyrene regions and is 100 nm on each side. The darkest regions correspond to the PI, the gray regions to the P4VP, and the white regions to the PS domains. The scale bar is 100 nm. c. Representative stress-strain curves of the bulk triblock terpolymer and diblock copolymer films.

The present invention provides methods of making an isoporous graded film comprising a multiblock copolymer and isoporous graded films comprising a multiblock copolymer. The present invention also provides devices comprising the films of the present invention.

The present invention is based on the surprising result that using 1,4-dioxane as a solvent in the fabrication of an isoporous graded films of multiblock copolymers provides films comprising a thin selective layer (i.e., a surface layer) having, for example, more than $10^{14}$ nearly monodisperse mesopores/$m^2$ above a graded microporous layer. The films of the present invention can have permeabilities comparable to current filtration membranes while producing solute rejections consistent with films containing monodisperse pores. Hybridization of the films via homopolymer or small molecule blending enables tuning of pore size, and can result in pure water flux and solute rejection characteristics.

In an aspect, the present invention provides methods of making isoporous graded films. The films comprise a multiblock copolymer. In an embodiment, the present invention is a facile and scalable method of fabrication of novel, isoporous graded, ABC-type triblock terpolymer-derived films. In an embodiment, the present invention provides an isoporous graded film made by a method disclosed herein.

In an embodiment, the method for forming an isoporous graded film of a multiblock copolymer comprises the steps of: a) forming a film comprising a multiblock copolymer having a hydrogen-bonding block on a substrate using a deposition solution comprising the multiblock copolymer and a solvent system comprising 1,4-dioxane; b) removing at least a portion of the solvent system from the film; and c) contacting the film from step b) with a phase separation solvent system, which results in formation of the isoporous graded film.

Any substrate on which a layer comprising a multiblock copolymer can be formed can be used. A wide range of substrate materials, sizes, and shapes can be used. The substrate can be solid or porous. Examples of suitable substrates include glass plates or rods, silicon, plastic (e.g., Teflon) porous membrane supports such as non-woven polyester, or any combination of the above. For example, non-woven polyester on top of glass can be used as a substrate.

A variety of multiblock copolymers can be used. For example, the multiblock copolymer can be a diblock copolymer, triblock copolymer, or higher order multiblock copolymer. In various embodiments, the multiblock copolymer is a triblock terpolymer having a structure of the form A-B-C, or A-C-B, or other variable arrangements or containing blocks of different chemical composition. In other embodiments, additional structures are higher order multi-block copolymer systems of the form A-B-C-B, or A-B-C-D, or A-B-C-B-A, or A-B-C-D-E, or other variable arrangements of these higher order systems. The multiblock copolymers can be synthesized by methods known in the art. For example, the copolymers can be synthesized using anionic polymerization, atom transfer radical polymerization (ATRP), or other suitable polymerization techniques. The multiblock copolymers can be also be obtained commercially.

The polymer blocks can have a broad molecular weight range. For example, blocks having a number averaged molecular weight ($M_n$) of from $1 \times 10^3$ to $1 \times 10^6$ g/mol, including all values to the 10 g/mol and ranges therebetween.

The multiblock copolymer has at least one hydrogen-bonding block. The hydrogen-bonding block can self-assemble with another structurally distinct polymer block of the multiblock copolymer (e.g., a hydrophobic block). The hydrogen-bonding block has an acceptor group or donor group that can participate in intramolecular hydrogen bonding. The hydrogen-bonding block can be a hydrophilic block. Examples of suitable hydrogen-bonding blocks include poly((4-vinyl)pyridine), poly((2-vinyl) pyridine), poly(ethylene oxide), poly(methacrylates) such as poly(methacrylate), poly(methyl methacrylate), and poly(dimethylethyl amino ethyl methacrylate), poly(acrylic acid), and poly(hydroxystyrene). In an embodiment, the hydrophilic block is poly((4-vinyl)pyridine).

The multiblock copolymer has additional blocks that are hydrophobic blocks. The hydrophobic blocks form the matrix of the film. For example, the multiblock copolymer can have one or two hydrophobic blocks in addition to the hydrogen-bonding block(s). Examples of suitable hydrophobic blocks include poly(styrenes) such as poly(styrene) and poly(alpha-methyl styrene), polyethylene, polypropylene, polyvinyl chloride, and polytetrafluoroethylene.

In an embodiment, at least one of the additional hydrophobic blocks is a low glass transition temperature ($T_g$) block. By low $T_g$ block it is meant that the block has a $T_g$ of 25° C. or less. The multiblock copolymer can have multiple low $T_g$ blocks. Examples of suitable low $T_g$ blocks include poly(isoprene), poly(butadiene), poly(butylene), and poly(isobutylene). In an embodiment, the multiblock copolymer comprises a low $T_g$ polymer block, a poly(styrene) block, and a poly((4-vinyl) pyridine) block.

Examples of suitable diblock copolymers include-b-, poly(styrene)-b-poly((4-vinyl)pyridine), poly(styrene)-b-poly((2-vinyl) pyridine), poly(styrene)-b-poly(ethylene oxide), poly(styrene)-b-poly(methyl methacrylate), poly(styrene)-b-poly(acrylic acid), poly(styrene)-b-poly(dimethylethyl amino ethyl methacrylate), poly(styrene)-b-poly(hydroxystyrene), poly(α-methyl styrene)-b-poly((4-vinyl)pyridine), poly(α-methyl styrene)-b-poly((2-vinyl) pyridine), poly(α-methyl styrene)-b-poly(ethylene oxide), poly(α-methyl styrene)-b-poly(methyl methacrylate), poly(α-methyl styrene)-b-poly(acrylic acid), poly(α-methyl styrene)-b-poly(dimethylethyl amino ethyl methacrylate), poly(α-methyl styrene)-b-poly(hydroxystyrene), poly(isoprene)-b-poly((4-vinyl)pyridine), poly(isoprene)-b-poly((2-vinyl) pyridine), poly(isoprene)-b-poly(ethylene oxide), poly(isoprene)-b-poly(methyl methacrylate), poly(isoprene)-b-poly(acrylic acid), poly(isoprene)-b-poly(dimethylethyl amino ethyl methacrylate), poly(isoprene)-b-poly(hydroxystyrene), poly(butadiene)-b-poly((4-vinyl)pyridine), poly(butadiene)-b-poly((2-vinyl) pyridine), poly(butadiene)-b-poly(ethylene oxide), poly(butadiene)-b-poly(methyl methacrylate), poly(butadiene)-b-poly(acrylic acid), poly(butadiene)-b-poly(dimethylethyl amino ethyl methacrylate), and poly(butadiene)-b-poly(hydroxystyrene).

Examples of suitable triblock copolymers include poly(isoprene-b-styrene-b-4-vinylpyridine), poly(isoprene)-b-poly(styrene)-b-poly((4-vinyl)pyridine), poly(isoprene)-b-poly(styrene)-b-poly((2-vinyl) pyridine), poly(isoprene)-b-poly(styrene)-b-poly(ethylene oxide), poly(isoprene)-b-poly(styrene)-b-poly(methyl methacrylate), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene)-b-poly(α-methyl styrene)-b-poly((4-vinyl) pyridine), poly(isoprene)-b-poly(α-methyl styrene)-b-poly((2-vinyl) pyridine), poly(isoprene)-b-poly(α-methyl styrene)-b-poly(ethylene oxide), poly(isoprene)-b-poly(α-methyl styrene)-b-poly(methyl methacrylate), poly(isoprene)-b-poly(α-methyl styrene)-b-poly(acrylic acid), poly(isoprene)-b-poly(α-methyl styrene)-b-poly(dimethylethyl amino ethyl methacrylate), poly(butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly(butadiene)-b-poly(styrene)-b-poly(acrylic acid), poly(butadiene)-b-poly(styrene)-b-poly(dimethylethyl amino ethyl methacrylate), poly(butadiene)-b-poly(styrene)-b-poly(hydroxystyrene), poly(butadiene)-b-poly(α-methyl styrene)-b-poly((4-vinyl) pyridine), poly(butadiene)-b-poly(α-methyl styrene)-b-poly((2-vinyl) pyridine), poly(butadiene)-b-poly(α-methyl styrene)-b-poly(ethylene oxide), poly(butadiene)-b-poly(α-methyl styrene)-b-poly(methyl methacrylate), poly(butadiene)-b-poly(α-methyl styrene)-b-poly(acrylic acid), poly(butadiene)-b-poly(α-methyl styrene)-b-poly(dimethylethyl amino ethyl methacrylate), and poly(butadiene)-b-poly(styrene)-b-poly(hydroxystyrene).

The total molar mass of the multi-block copolymer is such that the multiblock copolymer undergoes self-assembly (i.e., microphase separation). It is desirable that defect-free surfaces are formed upon meso- and macro-porous structure formation. For example, the total molar mass of the multiblock copolymer is from $5 \times 10^3$ to $5 \times 10^5$ g/mol, including all values to the 10 g/mol and ranges therebetween.

Multiblock copolymers can have a range of polydispersities ($M_w/M_n$). For example, the multiblock copolymer can have a polydispersity index (PDI) of from 1.0 to 2.0, including all values to the 0.1 and ranges therebetween. It is desirable that the multiblock copolymer have a PDI of 1 to 1.4.

The deposition solution is used to form a film comprising the multiblock copolymer on the substrate. The deposition solution includes at least a multiblock copolymer and a solvent system. It is desirable that the solvent system include at least 1,4-dioxane. The solvent system can also include an additional solvent or solvents. In various examples, the solvent system is 1,4-dioxane or a mixture of solvents where at least one of the solvents in the mixture is 1,4-dioxane. In various examples, the solvent system has at least 33% by weight or at least 50% by weight 1,4-dioxane. For example, a solvent system with 70/30 1,4-dioxane/tetrahdryofuran by weight can be used.

Without intending to be bound by any particular theory, it is considered that use of 1,4-dioxane in the deposition solvent results in the desired orientation of self-assembled morphology of the surface layer of the film upon evaporation.

The films can be formed without using a metal salt. In an embodiment, the deposition solution does not have a metal salt.

In an embodiment, the methods can be used to produce hybrid multiblock copolymer mesoporous films. The hybrid films are blends (e.g., blends of multiblock copolymers with a homopolymer (or homopolymers) or small molecules (or mixtures of small molecules). Accordingly, the deposition solution can also include a homopolymer or a small molecule. Examples of suitable homopolymers and small molecules are provided herein.

Examples of suitable solvents include tetrahydrofuran (THF), methanol, ethanol, toluene, chloroform, dimethylformamide, acetone, and dimethylsulfoxide. These solvents can be used in solvent systems with 1,4-dioxane.

The concentration of the multiblock copolymer in the deposition solution can be a factor in the structure of the resulting film. The concentration of multiblock copolymer can be selected based on parameters such as the chemical composition and molecular weight of the multiblock copolymer and the deposition solvent(s). The polymer concentration of the casting solution can be, for example, 5 to 50% by weight, including all integer values of % by weight and ranges therebetween. Typical concentrations of the multiblock copolymer in the deposition solution can be 8 to 20% by weight.

The multiblock copolymer layer can be deposited by a variety of methods known in the art. Examples of suitable deposition methods include doctor blade coating, dip coating, flow coating, slot coating, slide coating, inkjet printing, screen printing, gravure (flexographic) printing, spray-coating, and knife coating. For example, when doctor blade coating is used, the gate height can be adjusted to the desired height depending on the concentration of the copolymer in the casting solution. The doctor blade height can be set at, for example, from 50 μm to 500 μm.

At least a portion of the solvents in the solvent system is removed from the film after the film is formed from the deposition solution prior to contacting the film with a phase separation solvent system. Without intending to be bound by any particular theory, it is considered the solvent removal results in pores oriented perpendicular to the thin dimension of the film (i.e., the dimension normal to the substrate). For example, from 1 to 80% by weight, including all integer values of % by weight and ranges therebetween, of the solvent is removed. The amount of solvent in the film can be measured by techniques known in the art. For example, the amount of solvent in the film can be measured by infrared or UV/vis spectroscopy, or thermogravimetric analysis (TGA).

For example, at least a portion of the solvent(s) in the film is removed by allowing the as deposited film to stand for a period of time. The solvent evaporation is a variable process and can take place over a wide range of times (e.g., from seconds to minutes). The time is dependent on, for example, the deposition solution composition. The solvent removal step can include flowing a gas (e.g, air or nitrogen) or exposing the film to reduced pressure. Such steps can increase the rate of solvent removal.

After the solvent removal step, the film is contacted with a phase separation solvent system. This step is referred to herein as a NIPS (non-solvent induced phase separation) process. The solvent system can be a single solvent or a mixture of solvents. The solvent system is a non-solvent for the multiblock copolymer (i.e., at least one of the blocks of the multiblock copolymer precipitates in the solvent system). Further, in the case where 1,4-dioxane is used in the deposition solution, 1,4-dioxane must be miscible with the non-solvent for the NIPS process. Examples of suitable solvents for use in the NIPS process include water, methanol, ethanol, acetone, and combinations thereof.

Without intending to be bound by any particular theory, it is considered that contacting the film with a non-solvent causes the polymer blocks in the bulk layer to precipitate. The structure of the film is therefore locked in due to vitrification of the polymer. This step results in formation of a graded layer in the film.

The films resulting from the method have an identifiable surface layer and an identifiable bulk layer. There is an identifiable transition layer between the surface layer and the bulk layer. The transition layer has a structure having characteristics of both the surface layer and the bulk layer. The surface layer, transition layer, and bulk layer form a continuous film. The surface layer of the film is away from the substrate and bulk layer of film is disposed on the substrate. The film can be removed from the substrate providing a free-standing film.

The steps of the method described in the various embodiments and examples disclosed herein are sufficient to produce thin films of the present invention. Thus, in an embodiment, the method consists essentially of a combination of the steps of the method disclosed herein. In another embodiment, the method consists of such steps.

In an aspect, the present invention provides an isoporous graded film (also referred to herein as a mesoporous film). By "isoporous" it is meant that the surface layer of the films have a narrow pore size distribution. By "graded" it is meant that the films have a bulk layer where the bulk layer has asymmetric porosity. Isoporous graded films can be made by the methods disclosed herein. The film includes at least a multiblock copolymer. The multiblock copolymer can be one of those described herein. The film can be disposed on a substrate or can be a free standing film.

The isoporous graded films can have a variety of shapes. One having skill in the art will appreciate that films having a variety of shapes can be fabricated. The films can have a broad range of sizes (e.g., film thicknesses and film area). For example, the films can have a thickness of from 5 microns to 500 microns, including all values to the micron and ranges therebetween. Depending on the application (e.g., bench-top applications, biopharmaceutical applications, and water purification applications, the films can have areas ranging from 10 s of cm$^2$ to 10 s (even 100 s) of m$^2$.

The isoporous graded films can have desirable properties. For example, the films can have desirable mechanical properties (e.g., toughness) and permeability. The mechanical properties of the films can be tailored by use of selected multiblock copolymers. For example, film toughness can be improved by using a low $T_g$ poly(isoprene) block in the multiblock copolymer. In the case of isoporous graded films comprising triblock copolymers having a low $T_g$ block, the films can exhibit desirable toughness. For example, the films can have a toughness of greater than 5 GJ/m$^3$. For example, depending on the multiblock copolymer used and structure of the film, the films can exhibit a hydraulic permeability of at least 700 L m$^{-2}$ hr$^{-1}$ bar$^{-1}$.

The structural and performance characteristics of the films can include both stimuli responsive permeation and separation. The parent (i.e., not including a homopolymer or small molecule) and hybrid films can be tuned in a manner so that transport of various liquids and solids can be controlled. For example, the pore size of the films can be turned (e.g., increased or decreased) by hybridization of the film by incorporating a homopolymer or a small molecule in the deposition solution or by exposing the film to a specific pH solution (e.g., the film is exposed a feed solution having a desired pH after the NIPS process).

The isoporous graded film has a surface layer (also referred to herein as a top layer) and a bulk layer. The surface layer can have a range of thicknesses. For example, the surface layer can have a thickness of from 20 nm to 500 nm, including all values to the nm and ranges therebetween. The surface layer has a plurality of pores extending thorough the depth of the surface layer. The pores can have morphologies such as cylindrical and gyroid morphologies. The pores can have a size (e.g., diameter) of from 5 nm to 100 nm, including all values to the nm and ranges therebetween. The surface layer can have a range of pore densities. For example, the surface layer pore density can be from $1\times10^{14}$ pores/m$^2$ to $1\times10^{15}$ pores/m$^2$, including all values to the 10 pores/m$^2$ and ranges therebetween. In an embodiment, the density of the surface pores of a membrane as described herein is at least $10^{14}$ pores/m$^2$. The surface layer is isoporous. By "isoporous" it is meant that the pores have narrow pore size distribution. For example, a narrow pore size distribution (defined as the ratio of the maximum pore diameter to the minimum pore diameter ($d_{max}/d_{min}$)) can be from 1 to 3, including all values to 0.1 and ranges therebetween. In various examples, ($d_{max}/d_{min}$) is 1, 1.5, 2, 2.5, or 3. For example, the film comprises a surface layer having vertically aligned and nearly monodisperse mesopores. In an embodiment, the isoporous surface layer has a pore density of at least $1\times10^{14}$ pores/m$^2$ and a pore size distribution ($d_{max}/d_{min}$) of less than 3.

Without intending to be bound by any particular theory, it is considered that the morphology of the surface layer is, in part, a result of the self-assembly of the block copolymer. The morphology of this layer is dependent on the casting conditions (e.g., flow rate of environment around the film, water (humidity)/solvent concentration in environment around the film, evaporation time, casting speed, gate height) as well as the composition of the casting solvent (e.g., polymer molecular weight, chemistry, concentration, casting solvent or mixture of solvents).

The bulk layer is disposed between the surface layer and the substrate where the film is disposed on the substrate. This layer is a supporting sub-structure layer. The bulk layer can have a range of thicknesses. For example, the thickness of the bulk layer can be from 5 microns to 500 microns, including all values to the micron and ranges therebetween. The pores in the bulk layer can be from 10 nm to 100 microns in size (e.g., diameter), including all values to the nm and ranges therebetween. The bulk layer has an asymmetric structure. For example, the layer can have a sponge-like or finger-like structure. Moving from the top of this layer (e.g., the surface in contact with the surface layer) to the bottom of the layer (e.g., the free surface or surface in contact with the substrate), the pores increase in size. For example, the bulk layer can have pores having a size of 10 nm at the top of the bulk layer (layer in contact with the surface layer) and the pores increase in size to 100 µm at the bottom of the bulk layer. The increase in pore size moving though the depth of the film (e.g., from the surface of the bulk film in contact with the surface layer to the surface of the film in contact with the substrate) provides an asymmetric structure. This bulk layer is formed as a result of contacting (e.g., immersing) the film into a non-solvent bath (e.g., the NIPS process).

In an embodiment, the film is a hybrid film. The hybrid film further comprises a homopolymer or small molecule additive. The homopolymer or small molecule is blended in the multiblock copolymer. The homopolymer or small molecule can be blended in (i.e., mixed with) the hydrogen-bonding block or hydrophobic block of the multiblock copolymer. The homopolymer or small molecule preferentially associates with one of the blocks of the multiblock copolymer and locates in the vicinity of that block. For example, poly(phenylene oxide) can mix with a poly(styrene) block of a multiblock copolymer. For example, poly(butadiene) can mix with a poly(isoprene) block of a multiblock copolymer. Hybrid films can be prepared as described herein.

Any homopolymer that has the same chemical composition as or can hydrogen bond to at least one block (e.g., the hydrogen-bonding block) of the multiblock copolymer can be used. The homopolymer can have hydrogen bond donors or hydrogen bond acceptors. Examples of suitable homopolymers include poly((4-vinyl)pyridine), poly(acrylic acid), and poly(hydroxy styrene). It is desirable that the homopolymers or small molecules have a low or negative chi parameter with the hydrogen-bonding block (e.g., poly((4-vinyl)pyridine)). A range of ratios of multiblock copolymer to homopolymer can be used. For example, the molar ratio of multiblock copolymer to homopolymer can be from 1:0.05 to 1:10, including all ranges therebetween. The homopolymer can have a range of molecular weight. For example, the homopolymer can have a molecular weight of from $5\times10^2$ g/mol to $5\times10^4$ g/mol.

Any small molecule that can hydrogen bond to at least one block of the multiblock copolymer can be used. The small molecule can have hydrogen bond donors or hydrogen bond acceptors. Examples of suitable small molecules include pentadecyl phenol, dodecyl phenol, 2-4'-(hydroxybenzeneazo)benzoic acid (HABA). 1,8-naphthalene-dimethanol, 3-hydroxy-2-naphthoic acid, and 6-hydroxy-2-naphthoic acid. A range of ratios of multiblock copolymer to small molecule can be used. For example, the molar ratio of multiblock copolymer to small molecule can be from 1:1 to 1:1000, including all integer ratios therebetween.

In an embodiment, the film further comprises an inorganic material. The inorganic material is disposed on at least a portion of the film (e.g., the top, self-assembled surface layer surface, pore surface of the surface layer, and pore surface of the graded substructure). For example, the inorganic material can be in the form of nanoparticles. The nanoparticles can be, for example, 1 to 200 nm, including all values to the nanometer and ranges therebetween, in diameter. Examples of suitable inorganic materials include metals, metal oxides (e.g., silver oxide and copper oxide) and semiconductors (e.g., semiconducting nanoparticles such as CdS nanoparticles). For example, the inorganic material can be disposed on at least 50%, at least 60%, at least 70%, at least 80%, at least 90%, at least 95%, at least 99% of the surfaces of the film. In an example, the inorganic material is disposed on 100% of the surfaces of the film.

For example, the film further comprises a plurality of metal nanoparticles. The metal nanoparticles inorganic are disposed on at least a portion of the film (e.g., the top, self-assembled surface layer surface, pore surface of the surface layer, and pore surface of the graded substructure). The nanoparticles can complex (e.g., through weak intramolecular forces) with the multiblock copolymer of the film surface. The nanoparticles can be, for example, 1 to 200 nm, including all values to the nanometer and ranges therebetween, in diameter. Examples of suitable metals for the metal nanoparticles include gold, silver, platinum, palladium, cobalt, copper, nickel, iron, zinc, chromium, ruthenium, titanium, zirconium, molybdenum, aluminum, and cadmium. The nanoparticles can be mixtures of different nanoparticles. For example, the metal nanoparticles can be disposed on at least 50%, at least 60%, at least 70%, at least 80%, at least 90%, at least 95%, at least 99% of the surfaces of the film. In an example, the metal nanoparticles are disposed on 100% of the surfaces of the film. Films with silver nanoparticles can exhibit antimicrobial behavior.

The inorganic materials can be deposited on the film by methods known in the art. For example, the inorganic material can be deposited by electroless deposition methods.

In an aspect, the present invention provides devices comprising a film of the present invention. The films can be used in filtration applications (e.g, chemical/biological molecule separations, and water purification), drug delivery, and molecular sensing. Examples of filtration applications include concentration or purification of therapeutic proteins or other macromolecules, removal of water contaminants, and use as an air filter or penetrable catalyst support substrate. For example, the films can be used as filtration membranes in filtration devices (e.g., ultrafiltration devices) for concentration and/or purification or proteins, viruses, or other dissolved material, and as a separation media for liquid or vapor solutions. The devices can be made using methods known in the art.

The multiblock copolymers offer a functional approach for designing a versatile assortment of mesoscale hybrid materials, such as patterned media, and devices, including batteries, solar cells, and fuel cells. In addition to applications in drug delivery and nanofluidics, copolymer-derived mesoporous films can be used as separation media.

The following examples are presented to illustrate the present invention. They are not intended to limiting in any manner.

EXAMPLE 1

A novel triblock terpolymer, poly(isoprene-b-styrene-b-4-vinylpyridine) (ISV) was synthesized by anionic polymerization as the starting material for the formation of the graded mesoporous films described herein. FIG. 1a shows the chemical structure of the terpolymer together with a table of the polymer-solvent interaction parameter, $\chi_{1-2}$, with different solvents used here as calculated from solubility parameters. The material used in this study, referred to as ISV-77, had a total molar mass of 76.6 kg/mol, a polydispersity of 1.16 and volume fractions of 0.29, 0.56, and 0.15 for the polyisoprene (PI), polystyrene (PS), and poly-4-vinylpyridine (P4VP) domains, respectively. FIG. 1b shows both a small angle x ray scattering (SAXS) trace and a transmission electron microscopy (TEM) micrograph of a bulk ISV-77 film cast from chloroform, both of which are consistent with a hexagonally close packed cylinder morphology where P4VP forms the cylinder cores. In order to get an impression of the mechanical response of this material relative to a diblock copolymer of similar molecular characteristics, FIG. 1c compares representative stress strain curves for bulk ISV-77 and a bulk poly(styrene-b-4-vinylpyridine) (SV) sample with hexagonal P4VP cylinder morphology (data not shown). The SV diblock molar mass was 56 kg/mol with polydispersity of 1.19, and volume fractions of 0.71 and 0.29 for PS and P4VP, respectively. The area under the ISV-77 curve, representing the toughness of the material, is 9.0 GJ/m$^3$, almost triple that of the 3.20 GJ/m$^3$ toughness of the glassy SV, which can be attributed to the addition of the rubbery, low $T_g$ polyisoprene domain. The results of these tensile tests suggest that the ISV polystyrene domains are interconnected, which is evidenced by a more careful look at the morphology of this cast material (see inset in FIG. 1b). This simple bulk comparison demonstrates the potential for tuning the mechanical response of mesostructured materials by moving from diblock to tri-(multi-) block systems. Other advantages include the expanded phase space over which triblock terpolymers and other multiblock systems exhibit bicontinuous morphologies, which have been shown to exhibit enhanced mechanical properties due to the continuity of multiple domains, as well as additional control over chemical functionality.

The graded, mesoporous terpolymer films are formed using a combination of controlled solvent evaporation and non-solvent induced phase separation (NIPS). The solvent evaporation directs the self-assembly of the terpolymer in the selective layer and the subsequent NIPS process creates the underlying microporous structure. A vast parameter range was screened in order to find appropriate film formation conditions. The protocol for casting a film begins by dissolving the ISV in an appropriate solvent. This solvent must fulfill two requirements; it must result in the desired orientation of self-assembled morphology at the top surface of the film upon evaporation, and it must be miscible with the non-solvent for the NIPS process. After screening many options, a mixture of 1,4-dioxane/tetrahydrofuran (70/30 by weight) was found to fulfilled both these requirements. A 12 wt % polymer solution was drawn into a film on a glass substrate using a doctor's blade set at a gate height of 225 µm. After the film was cast, the solvent was allowed to evaporate for a predetermined period of time, during which the concentration of polymer at the air/film interface increased, driving the self-assembly of the terpolymer. The film was subsequently plunged into a non-solvent (water) bath, causing the precipitation of the polymer. The selection of polymer concentration, substrate, and gate height all affect the ultimate micro- and meso-structure of the resulting film, and were carefully optimized. For example, low polymer concentrations (<10 wt %) resulted in low polymer connectivity upon plunging in the non-solvent, while a hydrophobic Teflon substrate caused the film to de-wet. A large gate height (>400 µm) yielded cracks in the film due to instabilities at the free surface.

Figure 2:
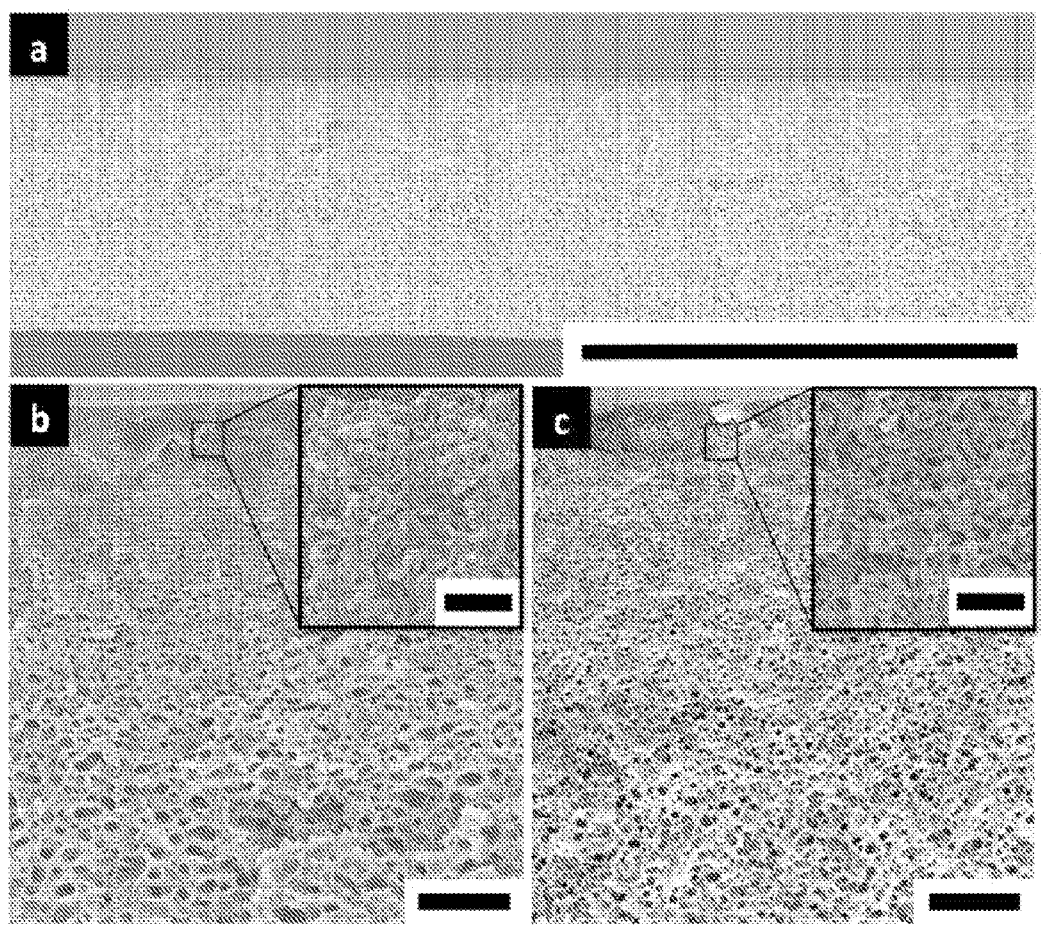
FIG. 2. Example of the non-solvent induced phase separation process. This process can form a sponge-like, graded structure in the membranes. a. Representative low-magnification SEM micrographs of the cross-section of an ISV-77 film. Scale bar is 100 μm b. Representative cross-sectional SEM of the as cast parent terpolymer film shows that the bottom of the film is macroporous and becomes denser as proximity to the top selective layer increases. Inset: higher magnification image of the phase inverted structure just below the separation layer shows that the region contains micropores. c. Representative cross-sectional SEM of the hybrid membrane displaying a similar graded structure. Inset: higher magnification image of the phase inverted structure just below the separation layer displays increased porosity compared to the parent structure. The scale bars for panels b and c are 5 μm and 500 nm in the main images and insets, respectively.

Scanning electron microscopy (SEM) micrographs of the cross-section of ISV-77 films are shown at different magnifications in FIGS. 2a and b, and display the graded structure that results from the protocol described above. The film is densest at the top surface of the film where the polymer concentration was highest prior to beginning the NIPS process. The micropores increase in size and the film becomes more open towards the bottom surface. 40 µm thick sheets of ISV-77 mesoporous films as large as 300 cm$^2$ were fabricated in the lab for transport testing. This fabrication method has the benefit of industrial scalability.

Figure 3:
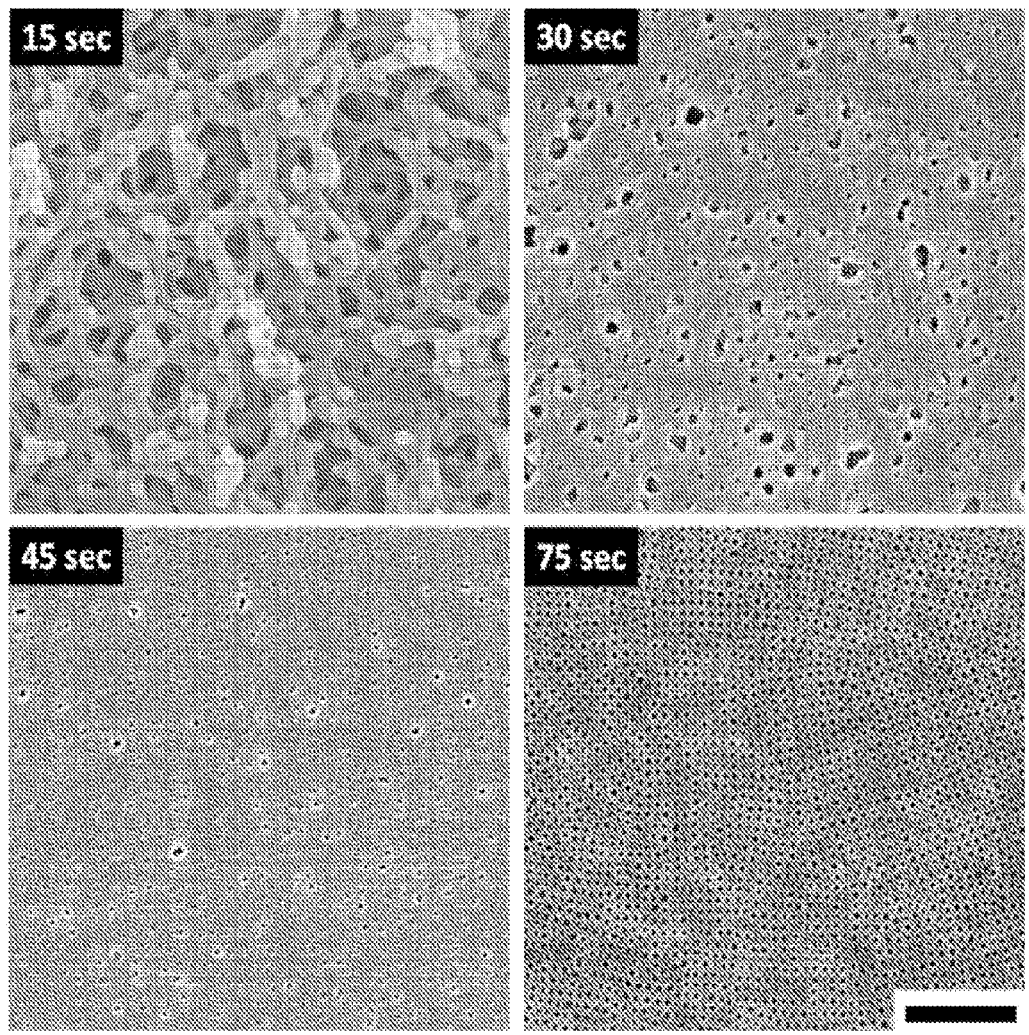
FIG. 3. Representative SEM micrographs show that the structure of the film surface can change with the length of the solvent evaporation period. Poly(isoprene-b-styrene-b-4 vinyl pyridine) films were cast from a 12 wt % solution of polymer in solvent. The solvent used was a 70/30 mixture (w/w) of dioxane and tetrahydrofuran (THF). After drawing down a film of polymer solution, solvent was allowed to evaporate for a predetermined period of time before plunging the film into a non-solvent (water) bath to initiate phase separation. For short evaporation times (15 and 30 seconds), a dense layer does not form, producing microporous films. At intermediate evaporation times (45 seconds) a dense layer forms, but the self-assembled terpolymer structure has just begun to nucleate resulting in few pores. Given sufficient time (75 seconds), the self-assembled structure nucleates and grows into the film producing a film with a high density of nanopores.

The length of the solvent evaporation step is another process variable that significantly affects the final structure of the film. Specifically, the solvent evaporation step is critical to directing the self-assembly of the terpolymer. Solvent evaporation into the open atmosphere created fast evaporation conditions, which can be used to orient the cylindrical domains perpendicular to the thin dimension of the film. FIG. 3 shows SEM micrographs of the top surface of films cast under identical conditions but with solvent evaporation times of 15, 30, 45, and 75 s. These micrographs elucidate the film structure dependence on the length of the evaporation step. For short evaporation times (i.e., 15 and 30 s), the local concentration of polymer was not high enough to form a dense skin layer. Thus, when the film was plunged into the water bath, a microporous structure resulted even at the surface. No dense regions were observed when an evaporation time of 15 s was used, while at 30 s dense regions were observed with pores 50-200 nm in diameter randomly distributed across the surface. The film cast using a 45 s evaporation period had a dense skin layer but only a few nanopores began to nucleate at the surface. Allowing the solvent to evaporate for 75 s produced the desired nanostructure—a selective skin layer containing a high density of nanopores ~20 nm in diameter. The narrow pore size distribution suggests that their structure is a result of triblock terpolymer self-assembly.

Cross sections of the self-assembled surface structure are readily visualized by transmission and scanning electron microscopy (FIG. 4a-c). FIGS. 4a and b show TEM micrographs of films selectively stained with $OsO_4$ (PI selective stain) and $I_2$ (P4VP selective stain), respectively. In FIG. 4a the circular dark regions, which appear cubically-packed at the top, correspond to the stained PI of the terpolymer. This intriguing structure is reminiscent of high impact polystyrene (HIPS), in which rubbery inclusions act to dissipate stress from the glassy PS surrounding it. Indeed this affords the film increased resistance against fracture which made handling of these membranes much easier as compared to, e.g., membranes derived from SV diblock copolymers (see FIG. 1c). In FIG. 4b the P4VP domains appear as the dark lines running vertically through the film. These domains are consistent with the mesopores running from the top surface into the underlying microporous support, as corroborated by the SEM micrograph in FIG. 4c. These channels act as highly uniform mesopores through which gases or liquids can be transported, and potentially separated. Interestingly, closer examination of the mesopores on the top surface of the terpolymer film reveals that their packing is in a square lattice rather than in a hexagonal array, as seen in the equilibrium bulk morphology. FIG. 4d shows a radially integrated FFT of an SEM micrograph of the top surface where indices consistent with a square packed lattice are marked. From this data, a pore d-spacing of 44 nm and an areal pore density of $5.2 \times 10^{14}$ pores/$m^2$ can be calculated.

The results above demonstrate the ability to fabricate large areas of mesoporous films containing a high density of nearly monodisperse pores. The unique kinetically-trapped structure of the films can be further studied by measuring transport properties, such as the permeability to liquids or gases and the ability to selectively reject dissolved solutes. These experiments not only provide more insight into the nanostructure of the film, but are also critical to examining the utility of the films in membrane filtration, drug delivery, and sensing applications.

Results of flow experiments conducted with acetate buffer solutions between pH 4 and 6 are shown in FIG. 5a; the hydraulic permeability of the films was a strong function of pH. At pH 5 and higher, there was a small increase in permeability with increasing pH. Below a pH of 5, the permeability decreased rapidly, reaching a value of 2.2 L $m^{-2}$ $hr^{-1}$ $bar^{-1}$ at pH 4, nearly 80 times lower than the permeability at pH 6 of 160 L $m^{-2}$ $hr^{-1}$ $bar^{-1}$.

Figure 4:
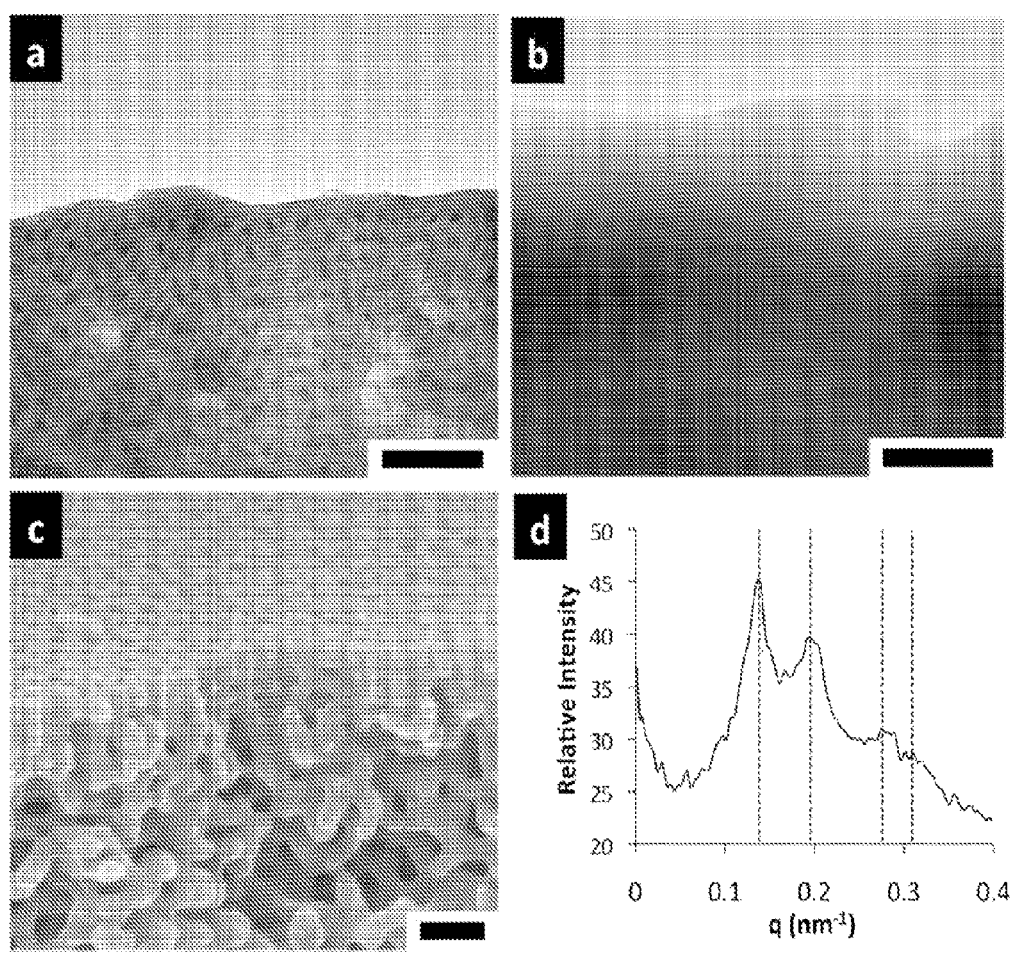
FIG. 4. Example of a self-assembled structure of the top layer. This layer is a kinetically trapped, non-equilibrium structure. a. Cubically packed poly(isoprene) spheres are identified by TEM where the PI domains were stained with $OsO_4$. b. A representative TEM micrograph of the selective layer with P4VP domains stained with $I_2$ demonstrates P4VP channels run through the selective layer. c. A representative cross sectional SEM micrograph shows open pores spanning the selective layer thickness, consistent with the $I_2$ stained TEM micrograph. Scale bars are equal to 100 nm. d. Radially integrated FFT of a representative SEM image of the top surface of the film. Dashed lines correspond to $(q/q^*)^2=1$, 2, 4, and 5, consistent with pores packed in a square lattice and yielding a d-spacing of 44 nm.

The stimuli responsive permeability provides evidence that the mesopores are coated with a P4VP brush, consistent with the micrographs in FIGS. 3 and 4. P4VP has a pKa of 4.6, which is near the pH where the films become pH responsive. At pH values below the pKa, the degree of protonation of the P4VP is higher, making it more soluble in the aqueous buffer solutions. The better solvated P4VP extends toward the center of the pore, slowing the flow of the aqueous solution. Conversely, deprotonated P4VP is not well solvated by the solutions and retracts against the pore walls to open the pores to flow. Similar results were obtained using a 50/50 (w/w) solution of ethanol/DI. In the presence of ethanol, which is a good solvent for P4VP, the permeability decreases to values similar to that at pH 4. These results suggest that it is the solvent quality for P4VP that results in the stimuli responsive nature of the films.

Solute rejection tests are a similarly valuable tool for exploring the structure of the mesoporous films, and critical to confirming an absence of defects. Single solute PEO samples dissolved in DI and ranging in molar mass from 4 to 203 kg/mol were used to challenge the films. Observed percent rejections were calculated by comparing the PEO concentration in the permeate and feed solutions. Results from these experiments are shown as open circles in FIG. 5b. As the PEO molar mass increases, the percent rejection also increases. For example, a 10 kg/mol sample was only slightly rejected (~18% rejection) while a 95 kg/mol sample was almost completely rejected (~95% rejection).

The solute rejection data can be used to estimate the pore size of the film. However, it is important to ensure the calculation of an intrinsic film property, and not an experimental artifact. Therefore, the observed rejections were converted to actual (or intrinsic) rejections to account for the local increase in the concentration of rejected solutes at the film interface due to concentration polarization. The mass transfer coefficient necessary for this calculation was determined using the correlation given by Zeman and Zydney. For all rejection experiments, the ratio of the volumetric flux to the mass transfer coefficient was between 0.7 and 1.6, indicating that the system was not highly polarized.

FIG. 5c shows the pore diameter of the films as calculated by comparing the actual rejection to a theory for the hindered transport of solutes in cylindrical pores. Because convection dominates transport through the mesopores, the theory of Zeman and Wales was used.

$$R = 1 - [(1-\lambda)^2[2-(1-\lambda)^2]\exp(-0.7146\lambda^2)]$$

This simplified expression, which gives results within 2% of more complicated expressions, is a function of $\lambda$, defined as the ratio of the solute size to the pore size. The hydrodynamic radius of PEO, $R_H$, was taken as the characteristic solute size. $R_H$ can be calculated from either tracer diffusion or intrinsic viscosity data sets, both of which are available in the literature. Using $d_{pore}$ as an adjustable parameter, the residual squared was minimized. This method gave $d_{pore}$ values of 15.9 and 21.8 nm when tracer diffusion and intrinsic viscosity were used to determine $2R_H$, respectively, and are in good agreement with the SEM micrograph in FIG. 3.

Figure 5:
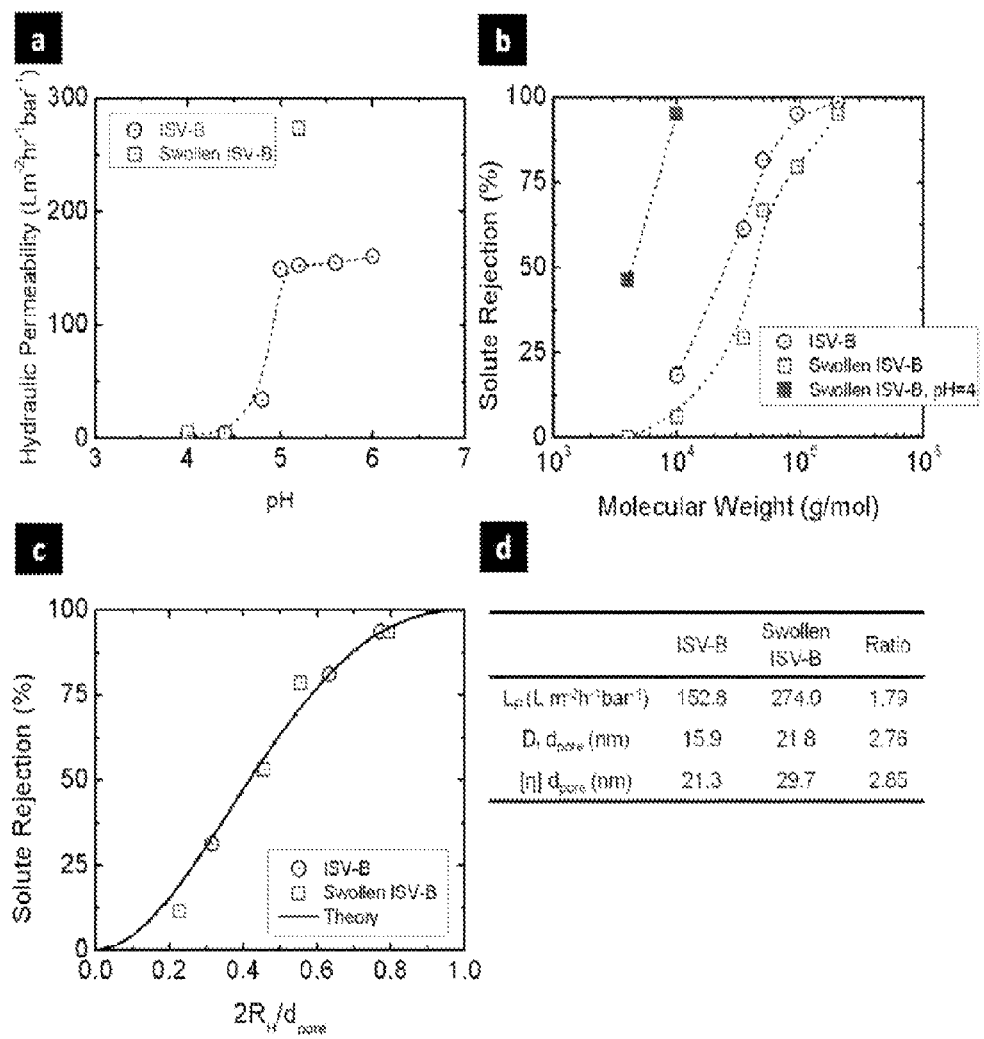
FIG. 5. Example of transport behavior of isoporous graded parent and hybrid films. a. Solution permeation was measured on a 4.1 $cm^2$ area of membrane at a pressure drop of 0.345 bar using buffer solutions of sodium acetate and acetic acid at varying pH of the feed solution. For membranes cast without swelling agents the hydraulic permeability ranges from 2.2 L $m^{-2}$ $h^{-1}$ $bar^{-1}$ to 160 L $m^{-2}$ $h^{-1}$ $bar^{-1}$ at pH=4 to pH=6, respectively. Membranes cast with swelling agents had a hydraulic permeability of 5.4 L $m^{-2}$ $h^{-1}$ $bar^{-1}$ at pH=4 and 274 L $m^{-2}$ $h^{-1}$ $bar^{-1}$ at pH=5.2. b. The nanoporous films reject dissolved solutes. Polyethylene oxide molecules with molar masses of 4, 10, 35, 50, 95, and 203 kg/mol were dissolved in water at a concentration of 1 g/L. Feed and permeate samples were collected and the PEO concentrations determined using total organic carbon analysis. c. The pore size of the ISV-77 and swollen ISV-77 films are estimated by fitting the experimental rejection data with a theory for the hindered transport of solutes in cylindrical pores. The data point at $2R_H/d_{pore} \approx 0.8$ for the parent ISV-77 film is for the 50 kg/mol PEO molecule while for the hybrid ISV-77 film it is for the 95 kg/mol PEO sample. d. Table of the hydraulic permeabilities and calculated pore diameters from diffusion and intrinsic viscosity data. For the hydraulic permeabilities, the ratio column is the quotient of the two values, while for the pore diameter this column represents the ratio of $\epsilon \cdot d_{pore}^2$.
Figure 6:
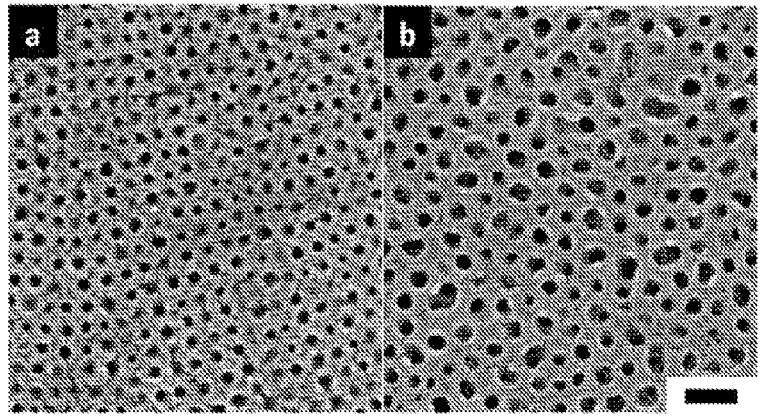
FIG. 6. Representative SEM micrographs of the top surface of mesoporous films a. Top surface of a parent ISV-77 film. b. Top surface of a hybrid ISV-77 film. Visual comparison of the parent and hybrid films indicates that the blended homopolymer P4VP increases the pore size, consistent with observed transport behavior. Scale bar is for both images and is 100 nm.

The ability to finely tune structural parameters by hybridization with other materials, thus tailoring, e.g., the transport properties of the terpolymer films is another exciting feature of these materials. For example, hybrid films fabricated by blending of a homopolymer that preferentially partitions into one domain of the block terpolymer can be utilized in the casting solution. These terpolymer-homopolymer blends selectively increase the size of the specified terpolymer domain, as demonstrated by the results shown in FIG. 5. Here, P4VP homopolymer with molar mass 5.1 kg/mol and polydispersity 1.06 was blended with the terpolymer in the casting solution to swell the effective volume fraction of P4VP from 0.15 to 0.22. Transport tests were used to confirm this observation. The open square data in FIG. 5a shows that these hybrid films remain stimuli-responsive. At pH=4, the permeability is equal to 5.4 L m$^{-2}$ h$^{-1}$ bar$^{-1}$, which is about 50 times lower than the permeability at pH=5.2 of 274 L m$^{-2}$ h$^{-1}$ bar$^{-1}$. These permeabilities measured for the hybrid ISV-77 films are higher than those of the neat ISV-77 films at the same pH, consistent with an increased pore size. Additionally, visual comparison of the pores in the top surface of parent ISV-77 films against homopolymer blended ISV-77 films confirms that the homopolymer increases the pore diameter.

FIG. 5b shows the results of solute rejection tests conducted with the hybrid membranes (square symbols). These experiments were run at a lower pressure drop to maintain similar hydrodynamic conditions to those used when testing the parent membrane. Following the protocol discussed above, an increased pore diameter of 21.3 and 29.7 nm was calculated for the hybrid membrane depending on whether tracer diffusion or intrinsic viscosity data was used to calculate the $R_H$ of PEO. FIG. 5c shows the fit obtained when intrinsic viscosity data was used to calculate the characteristic size of PEO.

A summary of the hydraulic permeabilities and estimated pore sizes for the parent and hybrid films is given as a table in FIG. 5d. Interestingly, the ratio of the hydraulic permeabilities of the hybrid to the parent film is 1.78, while the ratio of the product of the P4VP volume fraction and pore diameters squared is equal to 2.76 and 2.85 for tracer diffusion and intrinsic viscosity, respectively. Given that the hydraulic permeability of a membrane should vary as $\epsilon \cdot d_{pore}^2$ where $\epsilon$ is the void fraction of pores, the lack of a corresponding increase in the ratio for the hybrid membranes suggests an inhibition of flow due to the microporous support structure. While the homopolymer appears to act as a pore-forming agent in the substructure, as seen from a comparison of the insets of FIGS. 2b and 2c, it is expected that further improvements in the phase inverted structure will enhance the flux gain exhibited by the blended materials.

With the knowledge gained from the materials characterization and transport experiments, it is instructive to return to FIG. 1a and consider the physical processes occurring as the kinetically-trapped mesostructure of the selective layer develops. When dissolved in the casting solution, the ISV self-assembles into micelles with PI cores and an outer P4VP corona, which minimizes the unfavorable enthalpic interactions between the casting solvents and the PI chains (see table in FIG. 1). As the solvent evaporates from the film/air interface, and the local concentration of polymer increases, the terpolymer micelles begins to pack cubically. With further solvent evaporation, the terpolymer eventually feels a driving force to transition to the equilibrium hexagonal cylinder morphology. It has been proposed that the solvent concentration gradient when the micelles begin to transition to a cylinder morphology is responsible for orienting the cylinders perpendicular to the thin dimension of the film. Upon plunging the film into the non-solvent, the solvents and non-solvent begin to exchange, causing the ISV to precipitate, trapping the final structure of the selective layer. The exchange of solvent and non-solvent also results in the creation of free volume with the P4VP cylinders; as the solvent-swollen P4VP chains within the cylinders come into contact with the non-solvent, they collapse against the cylinder walls, forming channels of free volume within the cylinders, which is consistent with the observed stimuli responsive transport properties. The presence of free volume is also supported by the solute rejection curves in FIG. 5b, which demonstrate a size exclusion rejection consistent with open pores.

Methods. The poly(isoprene-b-styrene-b-4-vinylpyridine) triblock terpolymer used in this study was synthesized using a sequential anionic polymerization technique. The molecular weight of the terpolymer was determined using gel permeation chromatography, which was performed using THF as a solvent on a Waters 510 GPC instrument equipped with a Waters 2410 differential refractive index (RI) detector. The volume fraction of each block was calculated using the $^1$H solution nuclear magnetic resonance ($^1$H NMR) spectra obtained on a Varian INOVA 400 MHz spectrometer using CDCl$_3$ ($\delta$=7.27 ppm) signal as an internal standard.

Large sheets of mesoporous films were cast using the protocol described in the text. Circular samples 2.5 cm in diameter for solvent flow and solute rejection tests were punched out of larger sheets using a hole punch.

Solvent flow experiments were conducted in a stirred cell (Amicon 8010, Millipore Co.). Pressure to drive flow was applied using N$_2$ gas and was monitored using a digital pressure gauge. Deionized water (DI) was obtained from a Milli-Q ultrapure water purification system. Acetate buffer solutions were prepared by mixing 0.1 M acetic acid and 0.1 M sodium acetate aqueous solutions in the proper proportions. The flow rate was determined by measuring the permeate mass every 5 minutes. No prewetting step was required for the solvent flow experiments.

Solute rejection tests were performed using single solute PEO solutions at a concentration of 1 g/L in DI. The experimental procedure followed was similar to that described in the literature. PEO concentration in the feed and permeate was determined using a Shimadzu total organic carbon analyzer. For all experiments, the solution was stirred at a rate of 800 rpm. Tests on the ISV-77 films were run at a constant pressure drop of 5 psi while tests on the swollen ISV-77 films were run at a pressure drop of 3 psi to maintain similar hydrodynamic conditions between the two samples.

For TEM, both the bulk polymer film and the membranes were sectioned at 50-70 nm using a Leica Ultracut UCT cryo-ultramicrotome at −60° C. Microtomed samples were selectively stained with either OsO$_4$ (g) for 30 minutes or with I$_2$ (g) for 2 hours. Bright field TEM (BF-TEM) images were obtained using a FEI Technai F12 Spirit electron microscope equipped with a SIS Megaview III CCD camera, operated at an acceleration voltage of 120 kV.

SEM micrographs were acquired using a Hitachi Ultra-High Resolution Analytical Field Emission Scanning Electron Microscope (FE-SEM) SU-70. Samples were coated with gold-platinum for 30 s prior to imaging using an Emitech SC7620 sputtering machine.

SAXS measurements on the bulk terpolymer were performed at the Cornell High Energy Synchrotron Source (CHESS). The sample to detector distance was approximately 3.3 m. The x-ray wavelength was 1.305 Å, and the scattering vector, q, is defined as $$q = \frac{4\pi}{\lambda} \sin\theta$$

where θ is half of the scattering vector.

Mechanical tests were performed using a TA Instruments DMAQ800 instrument outfitted with film tension clamps. The films were fixed in the tension clamps with a torque of 0.6 in lb. and preloaded with a force of 0.01 N. Stress-strain curves were obtained using a ramp force of 0.50 N/min.

Poly(isoprene-b-styrene-b-4-vinylpyridine) synthesis. The poly(isoprene-b-styrene-b-4-vinylpyridine) triblock terpolymer used in this study was synthesized using a sequential anionic polymerization technique. The concentration of the polymer was kept under 10 wt % throughout the procedure. ~500 mL of benzene was distilled into a 1 L reactor and the anionic initiator sec-BuLi was added to the reactor in the glove box via syringe. Distilled isoprene was added to the reactor and allowed to polymerize for a minimum of 8 hours before a 5 mL aliquot was terminated with methanol for GPC analysis. Distilled styrene was then added to the reactor in the glove box via syringe. The styrene polymerized onto the polyisoprene block for 36 h, after which a small aliquot was terminated with methanol for GPC and NMR analysis. The benzene was subsequently removed from the reactor and a 10× molar excess of DPE relative to the sec-BuLi was added. ~500 mL of THF was distilled directly into the reactor, which was then cooled to −78° C. and distilled 4-vinylpyridine was added. The 4-vinylpyridine polymerized onto the poly(isoprene-b-styrene) for 1.5 h, after which the triblock terpolymer was terminated with degassed methanol. The final terpolymer was dissolved in chloroform and twice precipitated into methanol.

EXAMPLE 2

Examples of terpolymers used in the present invention. These terpolymers were prepared by the methods described in Example 1 Films were prepared using these terpolymers according to the methods described in Example 1.

TABLE 2

Examples of terpolymers of the present invention.

| | Molar Mass (g/mol) | PI volume fraction | PS volume fraction | P4VP volume fraction | PDI |
|---|---|---|---|---|---|
| ISV1 | 76.6 | 0.29 | 0.57 | 0.14 | 1.16 |
| ISV2 | 43 | 0.27 | 0.55 | 0.18 | 1.02 |
| ISV3 | 58.9 | 0.27 | 0.55 | 0.18 | 1.14 |
| ISV4 | 93.5 | 0.26 | 0.42 | 0.32 | 1.1 |
| ISV5A | 87 | 0.23 | 0.45 | 0.32 | 1.11 |
| ISV5B | 74.9 | 0.27 | 0.51 | 0.22 | 1.09 |
| ISV5C | 58.9 | 0.33 | 0.63 | 0.04 | 1.09 |
| ISV6 | 90.8 | 0.13 | 0.55 | 0.32 | 1.2 |
| ISV7 | 87.6 | 0.14 | 0.58 | 0.28 | 1.11 |
| ISV8 | 163.7 | 0.27 | 0.64 | 0.09 | 1.2 |
| ISV9 | 166.8 | 0.3 | 0.58 | 0.12 | 1.26 |
| ISV10 | 148.3 | 0.3 | 0.58 | 0.12 | 1.32 |
| ISV11 | 115 | 0.29 | 0.58 | 0.13 | 1.12 |
| ISV12 | 92.6 | 0.3 | 0.61 | 0.09 | 1.14 |
| ISV13 | 84.7 | 0.3 | 0.55 | 0.15 | 1.21 |
| ISV14 | 57.5 | 0.28 | 0.55 | 0.17 | 1.14 |
| ISV15 | 73.5 | 0.43 | 0.43 | 0.14 | |
| ISV16 | 37.5 | 0.35 | 0.4 | 0.25 | |
| ISV17 | 43.6 | 0.26 | 0.5 | 0.24 | |

EXAMPLE 3

Figure 7:
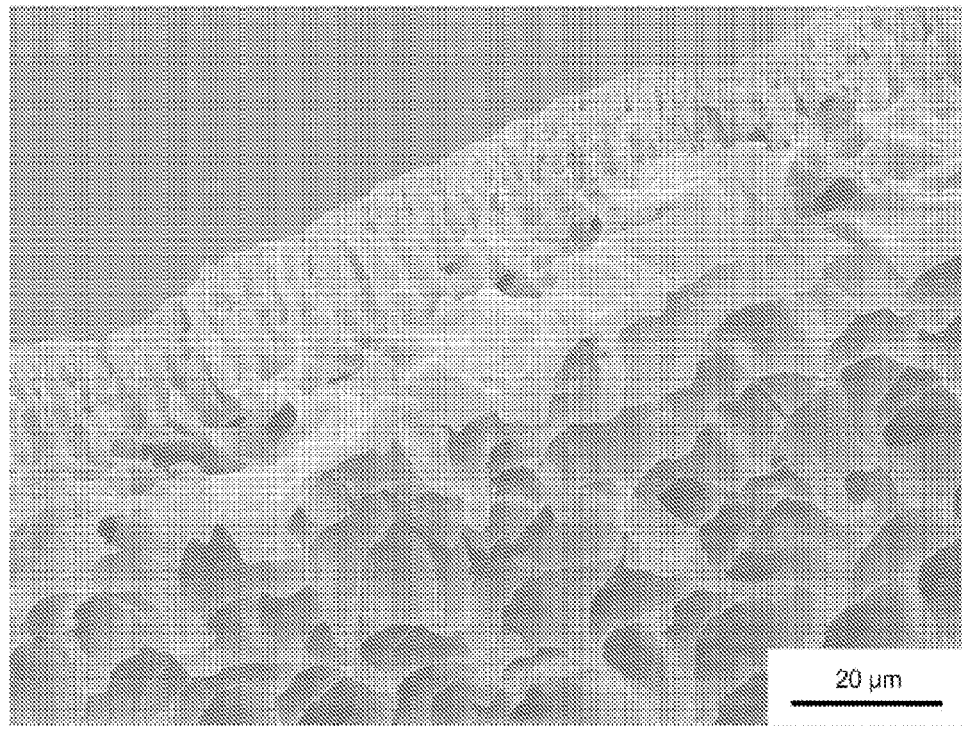
FIG. 7. Cross-sectional SEM image of a diblock copolymer poly(styrene-b-4-vinyl pyridine) (56 kg/mol, volume fraction P4VP is 0.21) cast from dioxane displaying a finger-like asymmetric sub-structure.
Figure 8:
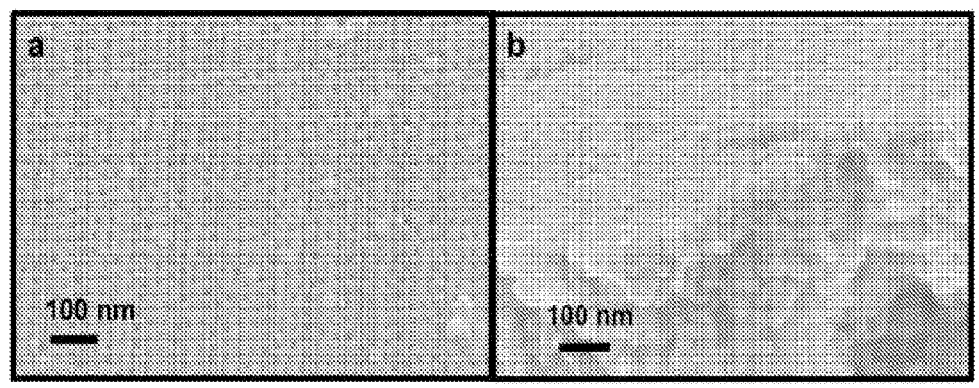
FIG. 8. SEM micrographs displaying the top surface (a) and the top surface with cross-section (b) of a diblock copolymer poly(styrene-b-4-vinyl pyridine) membrane cast from dioxane.

Example of diblock copolymer films of present invention. Films were prepared as described in Example 1. The films were deposited using a single solvent. Data for the films is shown in FIGS. 7-8.

EXAMPLE 4

Example of a multiblock copolymer film with inorganic coating.

Figure 9:
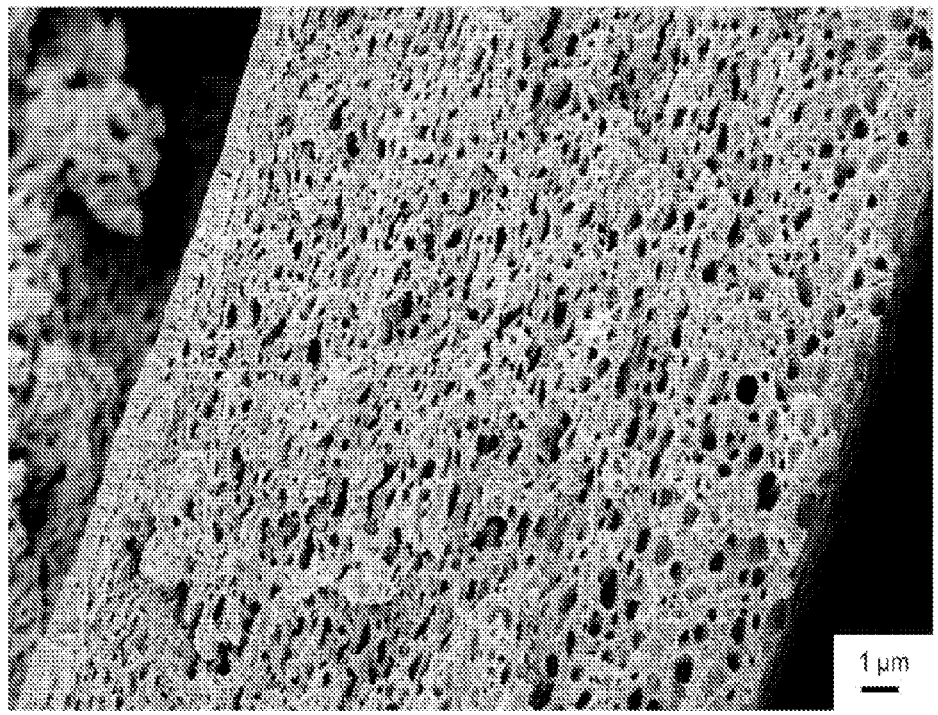
FIG. 9. Representative SEM cross-sectional images of a poly(isoprene-b-styrene-b-4-vinyl pyridine triblock terpolymer membrane (a.), backfilled porous nickel membranes after plasma removal of the polymer (b.), and high magnification near the top surface of the backfilled porous nickel membrane after plasma removal of the polymer (c.).
Figure 9:
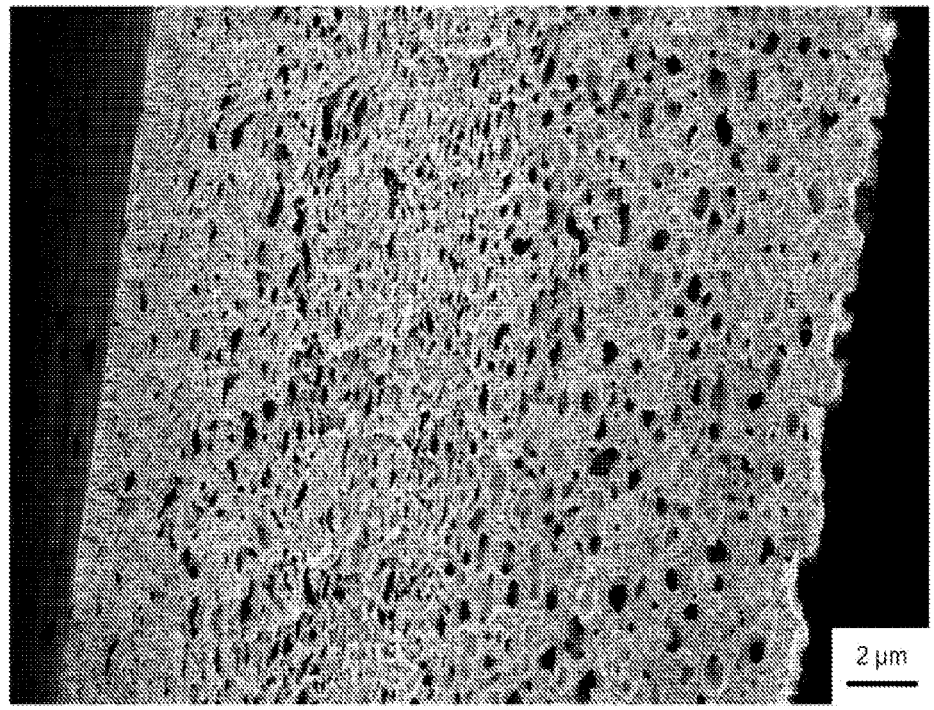
Figure 9:
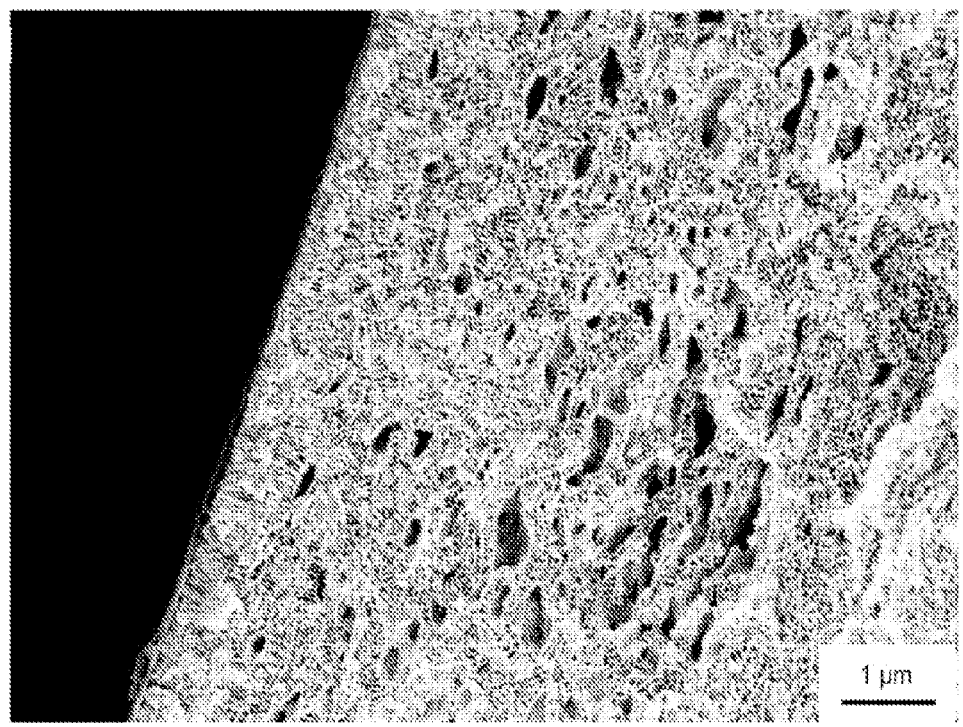

Inorganic membranes by backfilling. Terpolymer membranes were used as templates for backfilling with inorganic materials using an electroless plating method. The graded mesoporous membrane fabricated from triblock terpolymers (polyisoprene-b-styrene-b-4-vinylpyridine, 90.8 kg/mol (ISV6)) is shown in FIG. 9. Electroless nickel plating was performed by the following steps. The first step was sensitization, so that the surface of the pores absorbs $Sn^{2+}$ after immersing the template in an aqueous solution of tin chloride ($SnCl_2$). The next step was activation. After rinsing with deionized water, films were immersed in an aqueous solution of palladium chloride ($PdCl_2$). Pd(0), which served as a catalyst for Ni plating, was reduced by $Sn^{2+}$ and attached to the surface of the pores. The last step was nickel plating. After a thorough rinse with deionized water, Pd-containing hybrid films were immersed in an electroless nickel plating bath of the following composition: nickel sulfate, sodium citrate (complexant), lactic acid (buffer, complexant), and dimethyl amine borane (DMAB) (reductant). The pH of the nickel bath is adjusted to 7.0 using ammonium hydroxide.

After the metal deposition, the pores of the original polymeric film were filled or partially coated with metal. The organic template could be removed without affecting the metal structure using methods such as heat treatment, solvent reflux and plasma oxidation.

FIG. 9 (b. and c.) show a metal membrane after removal of the organic component via plasma treatment. By removing the polymer template, the hybrid organic/inorganic films are converted into a wholly inorganic material. This material is composed of a thin selective layer containing vertically aligned metal cylinders above a 3D connected macroporous support layer.

EXAMPLE 5

Example of multiblock copolymer film with metal nanoparticles.

Figure 10:
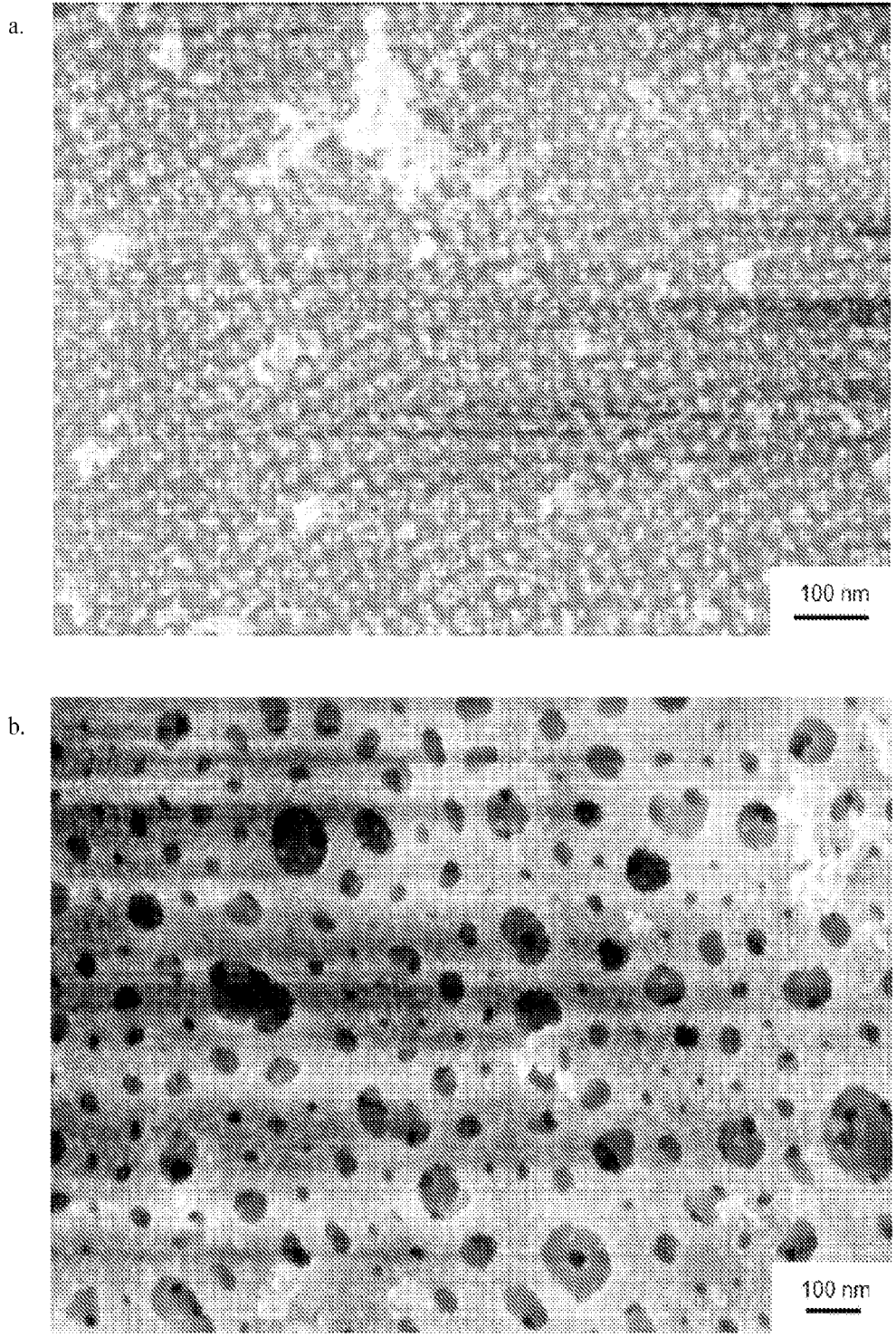
FIG. 10. Representative SEM images of the top surface (a.) and bottom surface (b.) of block copolymer membranes decorated with gold nanoparticles.

Metal treated antimicrobial and antibiofouling block copolymer membranes. Block copolymer membranes with chemistries that are known to complex with metals were decorated with a variety of metal nanoparticles. FIG. 10 shows an SEM image of the top and bottom of a poly (isoprene-b-styrene-b-4-vinyl pyridine) block copolymer membranes decorated with gold nanoparticles.

Figure 11:
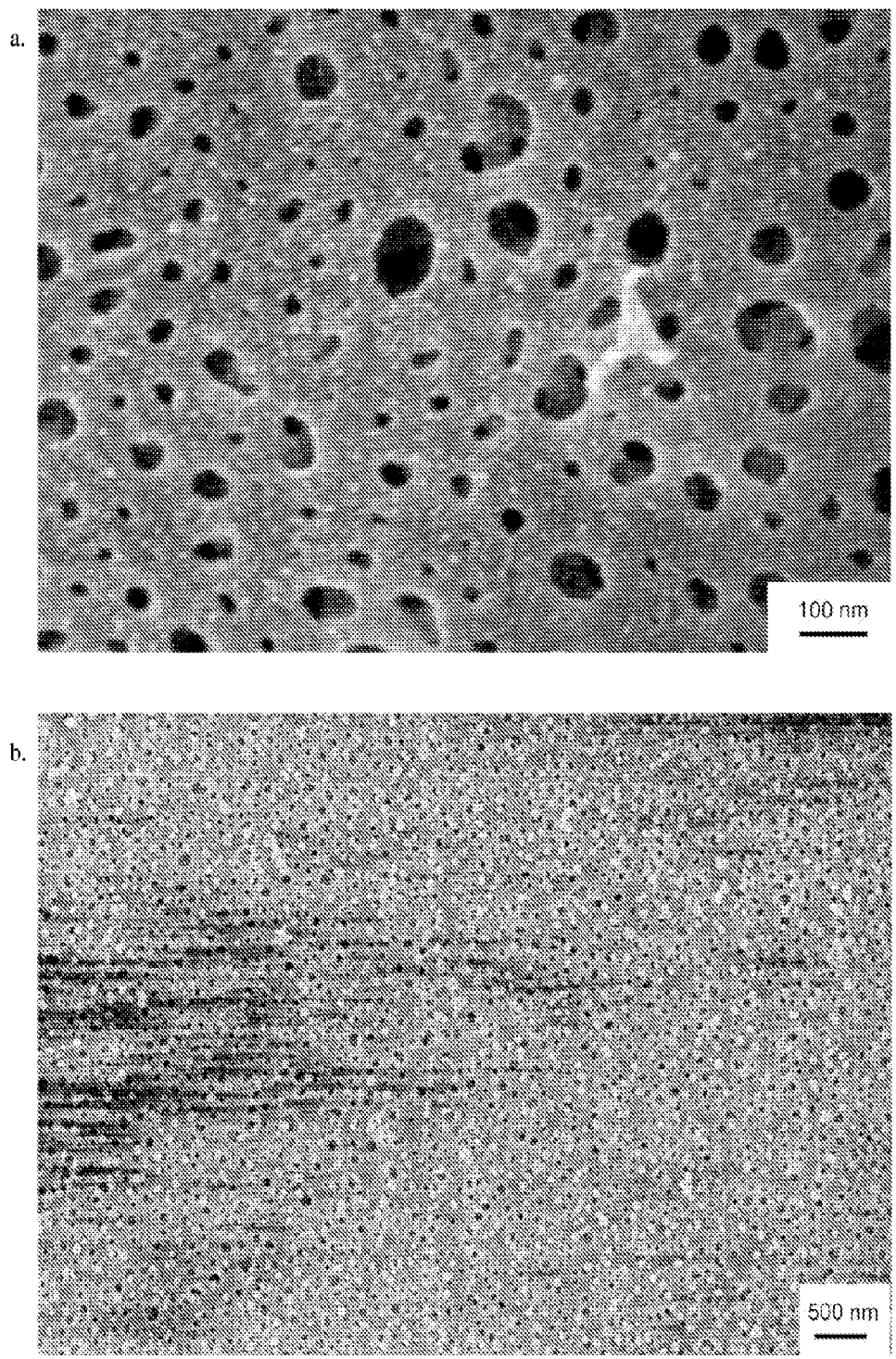
FIG. 11. Representative SEM images of the back surface of membranes decorated with small (a.) and large (b.) silver nanoparticles.

Gold decorated membranes were produced by immersion of triblock terpolymer membranes into a 25 mmol solution of hydrogen tetrachloroaurate(III) trihydrate in ethanol followed by reduction of the gold compound with sodium borohydride. Membranes decorated with silver nanoparticles, which are known to convey antimicrobial properties to a material, are displayed in FIG. 11.

Silver decorated membranes were produced by immersing the block copolymer membranes into 50 mmol solutions of silver trifluoroacetate in ethanol followed by reduction by ascorbic acid or sodium borohydride. Preliminary antimicrobial tests on these membranes were performed by bringing a live culture of *E. Coli* cells into contact with the silver decorated membrane surface and tracking colony growth via optical density measurements. The silver on the membranes were shown to not leach into the cell media and the silver is expected to reduce microbial growth.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A method for forming an isoporous graded film of a multiblock copolymer comprising the steps of:
   a) forming a film comprising a multiblock copolymer comprising at least one hydrogen-bonding block that can self-assemble on a substrate and at least one low Tg block having a Tg of 25° C. or less using a deposition solution comprising the multiblock copolymer and a solvent system comprising at least 33% by weight 1,4-dioxane;
   b) removing at least a portion of the solvent system from the film; and
   c) contacting the film from step b) with a phase separation solvent system, such that the isoporous graded film is formed.

2. The method of claim 1, wherein the hydrogen-bonding block is selected from the group consisting of poly((4-vinyl) pyridine), poly((2-vinyl) pyridine), poly(ethylene oxide), poly(methacrylate), poly(methyl methacrylate), poly(dimethylethyl amino ethyl methacrylate), poly(acrylic acid), and poly(hydroxystyrene).

3. The method of claim 1, wherein the low $T_g$ block is selected from the group consisting of poly(isoprene), poly (butadiene), poly(butylene), and poly(isobutylene).

4. The method of claim 1, wherein the deposition solution further comprises a homopolymer or a small molecule and the film further comprises the homopolymer or the small molecule.

5. The method of claim 1, wherein the solvent system further comprises a solvent selected from the group consisting of tetrahydrofuran, methanol, ethanol, toluene, chloroform, dimethylformamide, acetone, and dimethylsulfoxide.

6. The method of claim 1, wherein the concentration of multiblock copolymer is from 5 to 50% by weight.

7. The method of claim 1, wherein the multiblock copolymer further comprises at least one hydrophobic block.

8. The method of claim 7, wherein the multiblock copolymer comprises at least two different hydrophobic blocks.

9. The method of claim 7, wherein the hydrophobic block is a poly(styrene).

10. The method of claim 7, wherein the hydrophobic block is one of poly(alpha-methyl styrene), polyethylene, polypropylene, polyvinyl chloride, or polytetrafluoroethylene.

* * * * *